C. E. FORSYTH & F. S. ELLETT.
BACK PEDALING COASTER BRAKE.
APPLICATION FILED FEB. 13, 1908.
953,688.
Patented Apr. 5, 1910.
FIG. 1.
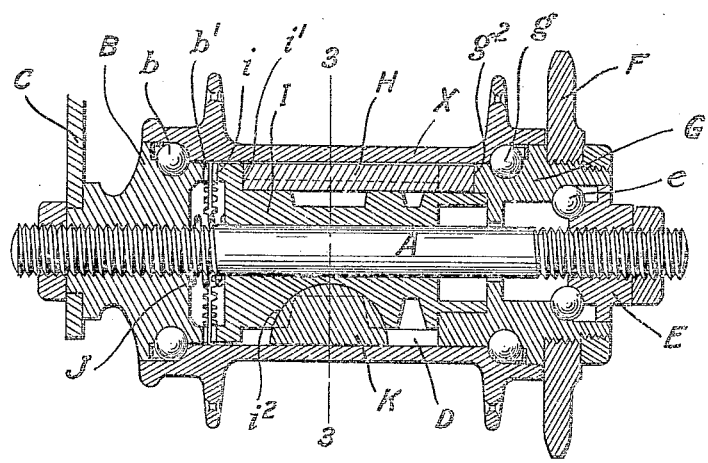
FIG. 2.
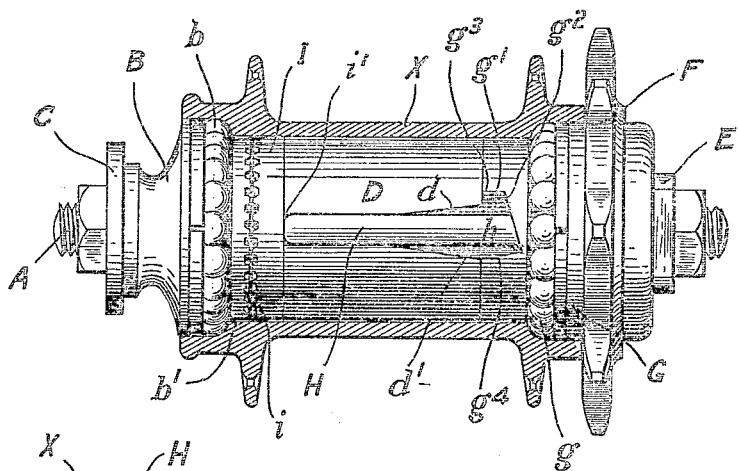
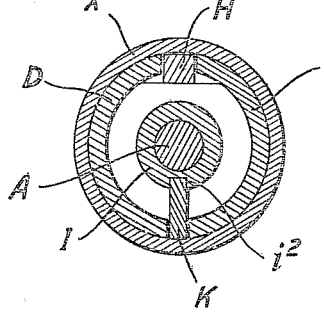
FIG. 3.
FIG. 4.
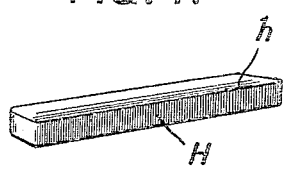
WITNESSES:
Clarence W. Carroll
D. Gurnee
INVENTORS.
Clayton E. Forsyth and
Frederick S. Ellett
by Osgood & Davis
their attorneys

UNITED STATES PATENT OFFICE.

CLAYTON E. FORSYTH AND FREDERICK S. ELLETT, OF ELMIRA, NEW YORK, ASSIGNORS TO ECLIPSE MACHINE COMPANY, OF ELMIRA, NEW YORK, A CORPORATION OF NEW YORK.

BACK-PEDALING COASTER-BRAKE.

953,688.

Specification of Letters Patent. Patented Apr. 5, 1910.

Application filed February 13, 1908. Serial No. 415,726.

*To all whom it may concern:*

Be it known that we, CLAYTON E. FORSYTH and FREDERICK S. ELLETT, citizens of the United States, and residents of Elmira, in the county of Chemung and State of New York, have invented certain new and useful Improvements in Back-Pedaling Coaster-Brakes, of which the following is a specification.

This invention relates to back pedaling coaster brakes for bicycles and like vehicles, and has for its object to produce a device of few parts, and simple, strong construction.

In the drawings: Figure 1 is a sectional, longitudinal elevation of the hub; Fig. 2 is a side view of the hub, cut away so as to disclose the interior construction; Fig. 3 is a cross-section on the line 3—3 of Fig. 1; and Fig. 4 is a perspective view of the actuating lever.

The axle A is intended to be clamped in the forks of the bicycle in the usual way, and the hub X is revoluble thereon, being supported by ball bearings. The ball bearings $b$ at the left of the hub lie in a race formed on the block B, which is held against rotation by the brake arm C when the latter is attached in the usual manner to a stationary part of the bicycle frame. This block B also constitutes one member $b'$ of a clutch, whereby the brake shell D is held against rotation on back pedaling in the manner soon to be described.

On the right the nut E supports a set of balls $e$ that in turn support the driving sprocket F and the block G rigidly attached thereto. This block G serves as a race for the ball bearings $g$ that support the right hand end of the hub X.

It is obvious that if the brake shell D is revoluble with the driving sprocket, it will, when expanded out against the hub X, constitute a driving clutch connection between said sprocket and hub for forward driving, provided said brake shell D is not at the same time locked to the stationary block B.

It is equally obvious that if the brake shell D is first anchored to the stationary block B, and then expanded, it will, by frictional contact with the hub X, retard the latter, assuming that the hub is rotating freely under a forward impulse.

The connection between the driving sprocket F and the brake shell D, whereby the latter is caused to rotate with the former, is established through the lever H, which lies between the ends of the split brake shell D, and which has one end $h$ at the right projecting out from the brake shell and into a recess $g'$ in the block G.

The brake shell D and the lever H are both supported within the hub by the sleeve I. This sleeve I also constitutes the means for locking the brake shell D to the stationary block B, so that it will not rotate on back pedaling, and this is accomplished by forming a clutch face $i$ on the side of this sleeve which is adapted to engage the clutch face $b'$ on the stationary block B.

In the drawings the parts are represented in their intermediate positions, and the clutch faces $b'$ and $i$ are out of contact. When forward pressure on the pedals is suspended, and they are held stationary to permit the wheel to coast, the brake shell contracts and releases the hub, while, at the same time, a cam face $g^2$ on the block G forces the lever H inwardly against the shoulder $i'$, thereby moving the sleeve I longitudinally into engagement with the anchor B. As long as the pedals are held stationary, no braking action will be applied to the hub X, for even after the clutch faces $b'$ and $i$ on the stationary block B and the sleeve I, respectively, engage, it requires the exertion of considerable backward pressure on the pedals to expand the brake shell by means of the lever H. On further back pedaling, however, the shoulder $g^3$ at the forward end of the recess $g'$ engages the end $h$ of the lever H, and causes the lever to pry apart the ends of the brake shell D, so that it expands out against the hub and affords a strong brake.

On resuming forward pedaling, the brake shell D contracts as it is released from tension, the lever H slips into the lower part of the socket $g'$, in which position it is shown in Fig. 2, at the same time withdrawing from the shoulder $i'$ on the sleeve I, and the teeth of the clutches $b'$ and $i$ disengage and are freed from each other. This action is caused by the coiled spring J, which surrounds the axle A and lies between the clutch faces $b'$ and $i$, as shown in Fig. 1. Next the lever H is engaged by the shoulder $g^4$ on the block G and caused to pry apart the ends of the brake shell D, so that said shell is expanded out against the hub X.

This time the brake shell D becomes a driving clutch to connect the driving sprocket F with the hub X, since there is no engagement between the brake shell D and its anchor to maintain the former from rotation.

In order to get greater leverage on the brake shell D, its edges are cut away at $d$ and $d'$.

In the drawings the brake shell D is represented as comprised of two shoes (see Fig. 3), and is shown as revolubly connected with the sleeve I by a stop K that fits into a recess $i^2$ in the sleeve I and projects out radially between the ends of the brake shoes D, D, as shown in Fig. 3.

What we claim is:—

1. In a back pedaling coaster brake, the combination with a supporting shaft, of a wheel hub; a driver therefor; a brake anchor; an expansible, split ring, normally disconnected from the anchor; a lever, extending from the driver into the brake ring; a sleeve upon the axle, supporting the expansible ring and provided with means to engage the anchor, and having a shoulder to receive the longitudinal thrust of said lever in the direction of the anchor, whereby the sleeve is brought into engagement with said anchor; means for connecting said sleeve and expansible ring revolubly together; separated shoulders on the driver, that engage the lever on forward driving and back pedaling, respectively, to expand the split ring; and means carried by the driver, and adapted on back pedaling to engage the lever to move it longitudinally in the direction of the anchor; substantially as shown and described.

2. In a back pedaling coaster brake, the combination with a supporting shaft, of a wheel hub; a driver therefor; a brake anchor; an expansible, split ring, normally disconnected from the anchor; a lever, extending from the driver into the expansible ring; a sleeve upon the axle, supporting the expansible ring and provided with means to engage the anchor, and having a shoulder to receive the longitudinal thrust of said lever in the direction of the anchor, whereby the sleeve is brought into engagement with said anchor; means for connecting said sleeve and expansible ring revolubly together; separated shoulders on the driver, that engage the lever on forward driving and back pedaling, respectively, to expand the split ring; and a cam surface on the driver between said shoulders, adapted on back pedaling to engage the lever to move it longitudinally in the direction of the anchor; substantially as shown and described.

3. In a back pedaling coaster brake, the combination with a supporting shaft, of a wheel hub; a brake anchor at one end of the hub; an expansible, split shell, normally disconnected from the anchor; a lever that enters the expansible shell, and projects out therefrom, a driver at the opposite end of the hub from the anchor, having a recess that receives the projecting end of the lever, and shoulders that engage the lever on forward driving and back pedaling, respectively, connected by a cam surface that on back pedaling engages the lever to move it longitudinally in the direction of the anchor; a longitudinally movable sleeve upon the axle, supporting the expansible shell, and having a shoulder to receive the thrust of the lever; and means for connecting said sleeve and expansible shell revolubly together; substantially as shown and described.

CLAYTON E. FORSYTH.
FREDERICK S. ELLETT.

Witnesses:
DAVID L. WHITTIER,
RALPH D. WEBSTER.